United States Patent [19]

Concannon

[11] Patent Number: 5,059,846

[45] Date of Patent: Oct. 22, 1991

[54] BRUSH HOLDING APPARATUS FOR A DYNAMOELECTRIC MACHINE

[75] Inventor: Brian T. Concannon, Countryside, Ill.

[73] Assignee: General Motors Corporation, Detroit, Mich.

[21] Appl. No.: 644,133

[22] Filed: Jan. 22, 1991

[51] Int. Cl.[5] .......... H02K 13/00

[52] U.S. Cl. .......... 310/239; 310/42; 310/89; 310/91; 310/240; 310/242

[58] Field of Search .......... 310/239, 240, 242, 245, 310/246, 247, 248, 249, 238, 42, 89, 91; 29/597

[56] References Cited

U.S. PATENT DOCUMENTS

| | | | |
|---|---|---|---|
| 2,763,801 | 9/1956 | McDonald | 310/239 |
| 3,271,605 | 9/1966 | Drabik | 310/239 |
| 3,430,084 | 2/1969 | Hall | 310/242 |
| 3,983,432 | 9/1976 | Rankin | 310/242 |
| 4,075,523 | 2/1978 | Lafferty, Sr. | 310/239 |
| 4,296,346 | 10/1981 | Ooki | 310/242 |
| 4,347,455 | 8/1982 | Major | 310/239 |
| 4,389,588 | 6/1983 | Rankin | 310/242 |
| 4,409,508 | 10/1983 | Ooki | 310/239 |
| 4,663,552 | 5/1987 | Ohmstedt | 310/246 |
| 4,800,313 | 1/1989 | Warner | 310/242 |

OTHER PUBLICATIONS

Vulcan "Constant Force Spring Design Guide"; (no month) 1987; Vulcan Spring & Mfg., Co; pp. 1-3, 7.

*Primary Examiner*—R. Skudy
*Attorney, Agent, or Firm*—Mark A. Navarre

[57] ABSTRACT

A brush holding assembly comprises two elements: a body element semi-permanently secured to the machine housing and a cartridge element detachably secured to the body element. The cartridge element includes at least one brush compartment having upper and lower faces with brush openings through which an elongated brush element can be inserted. The face of the cartridge element which is adapted to be secured to the body element has a service opening for spring insertion. At the time of servicing, a twin coiled spring is inserted into the compartment via the service opening and the new brush is inserted into the compartment via the lower face brush opening. As the brush is more fully inserted, it engages the spring element between its coils, and the end of the brush eventually emerges through the upper face brush opening, unwinding the spring coils which are retained within the compartment by the upper face of the cartridge element. The fully inserted brush is retained within the compartment by a retractor clip until the cartridge element is reattached to the body element.

4 Claims, 4 Drawing Sheets

BRUSH HOLDING APPARATUS FOR A DYNAMOELECTRIC MACHINE

This invention relates to a brush holding apparatus for a dynamoelectric machine, and more particularly, to an assembly including an easily removable cartridge to facilitate brush replacement.

BACKGROUND OF THE INVENTION

Brush and brush holder maintenance often causes substantial down time expense, especially in the case of large dynamoelectric machines, such as locomotive DC traction motors. The length of the brushes is often limited by the holder design, and the harsh environment often contributes to premature failure of exposed portions of the holder and spring elements.

Various arrangements have been proposed for simplifying brush replacement and maintenance, but engineering design tradeoffs have typically limited the brush length, compromised the protection of the brush holding apparatus, or unduly increased the complexity of the assembly.

SUMMARY OF THE PRESENT INVENTION

The present invention is directed to an improved brush holding assembly which (1) is easily removable to facilitate servicing, (2) has very few parts to be maintained, (3) permits usage of relatively long brushes, and (4) provides improved protection of the brush holding apparatus.

The brush holding apparatus of this invention comprises two elements: a body element semi-permanently secured to the machine housing, and a cartridge element detachably secured to the body element. The cartridge element is subdivided to form a number of juxtaposed brush compartments, the upper and lower faces of each compartment having brush openings through which an elongated brush element can be inserted. The brushes are resiliently tensioned against the commutator bars of the machine by twin coil spring elements, the coils of which are retained in coil compartments adjacent each brush compartment. The springs are accessed via service openings formed in the face of the cartridge element which abuts the body element so that the coil compartments are completely closed when the cartridge element is installed in the machine.

To service the brushes, the cartridge element is detached from the body element and taken to a remote service area. There, the worn brushes are removed through the lower face opening of each brush compartment, and the spring elements are removed for inspection via the service openings. A cleaned or renewed spring element is then inserted into each compartment via the respective service opening, and the end of the new brush is inserted into the compartment via the lower face brush opening. As the brush is more fully inserted, it engages the spring element between its coils and the pigtail end of the brush eventually emerges through the upper face brush opening, unwinding the spring coils which are retained within the coil compartments. The brushes are then retained in the fully inserted position by a retractor clip until the cartridge element is reattached to the body element.

The through-the-cartridge design permits the use of relatively long brushes to extend the motor service intervals, and the portions of the spring elements in proximity to the machine rotor are enclosed within the cartridge element to protect the spring from contamination and electrical flash-over damage. The design is simple with very few moving parts, and the easily removable nature of the cartridge encourages brush replacement remote from the machine.

DETAILED DESCRIPTION OF THE INVENTION

Figure 1:
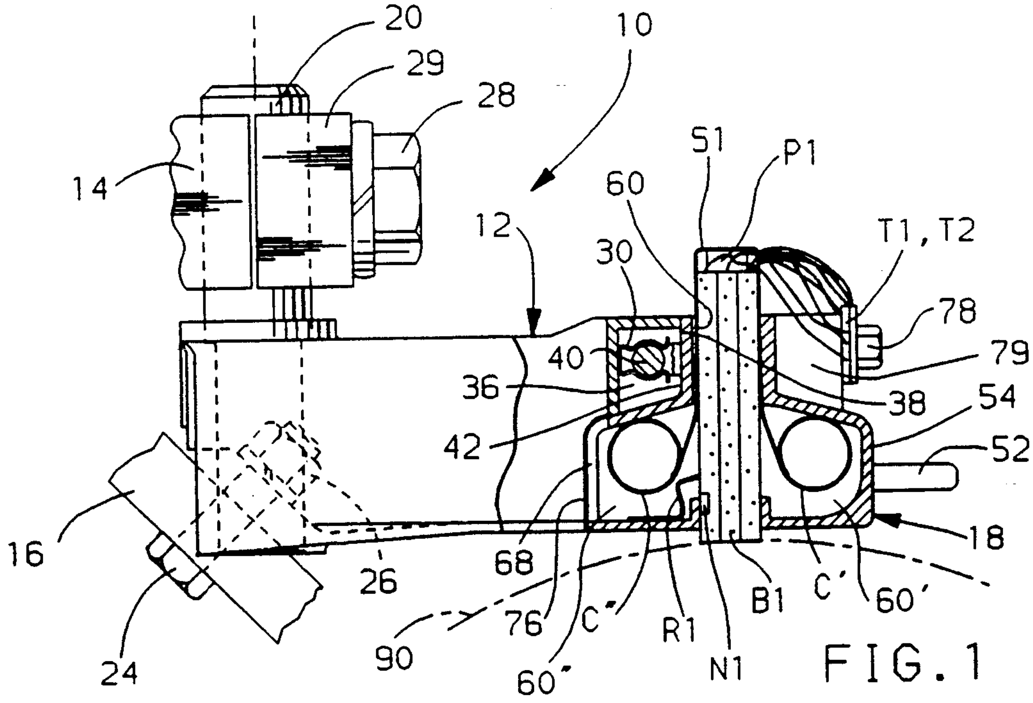
FIG. 1 is a partial sectional view of the brush holder apparatus of the present invention as installed in a rotary dynamoelectric machine.
Figure 2:
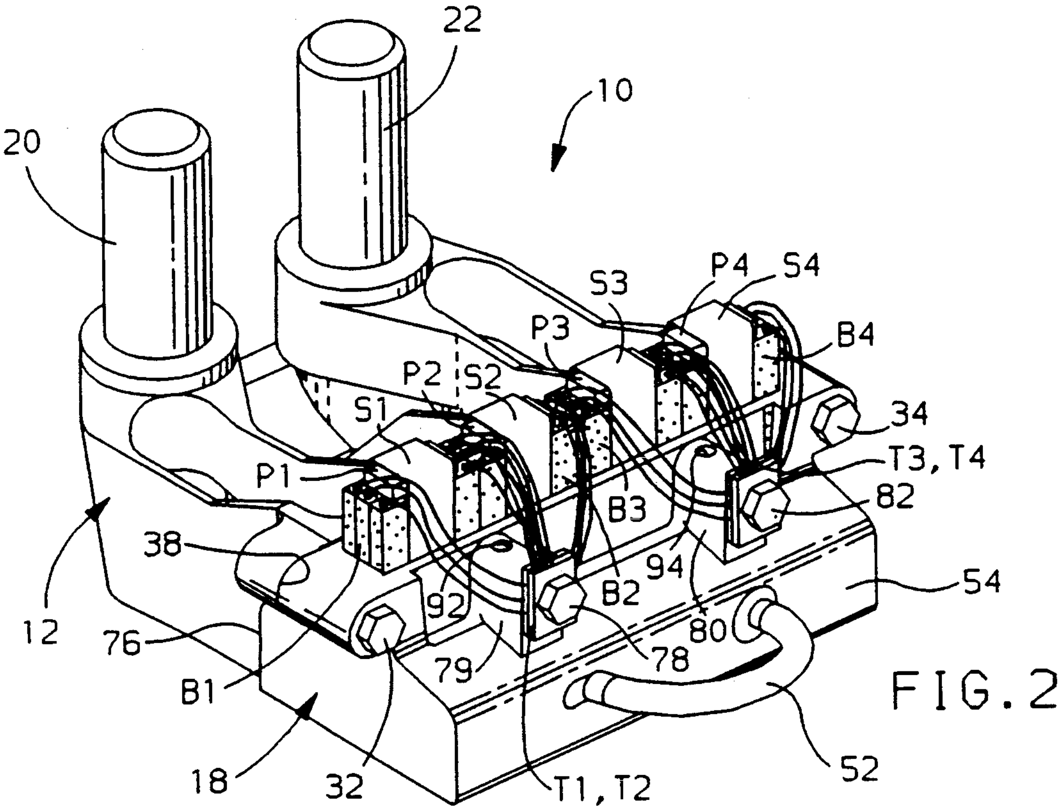
FIG. 2 is a perspective view of the body element and attached cartridge element.
Figure 3:
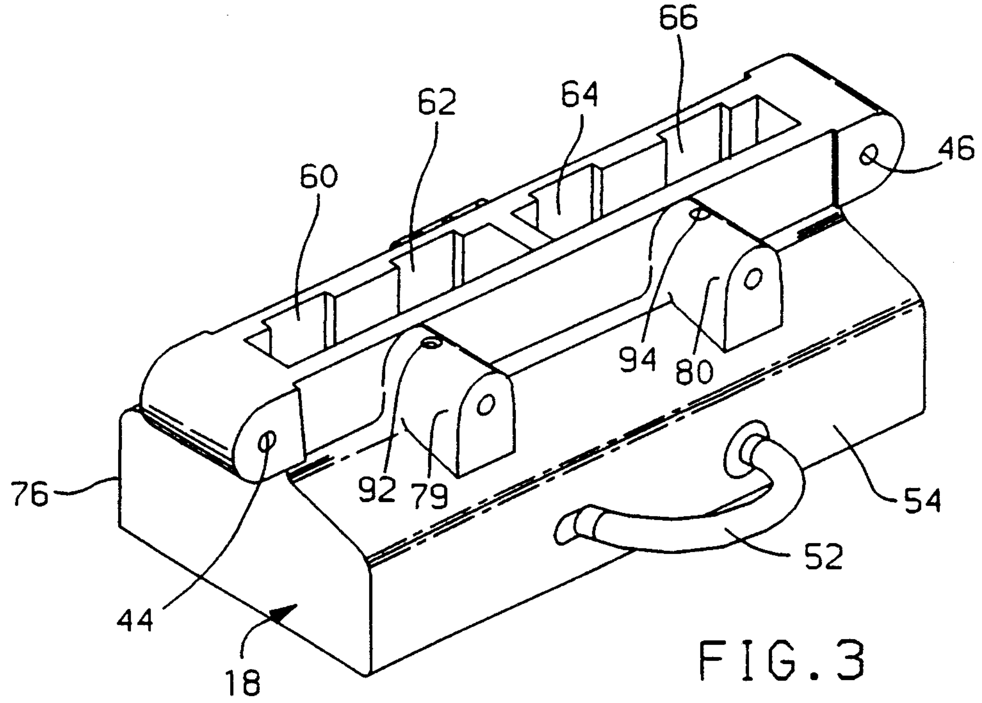
FIGS. 3 and 4 are perspective views of the cartridge element and FIG. 5 is a perspective view of the body element.
Figure 4:
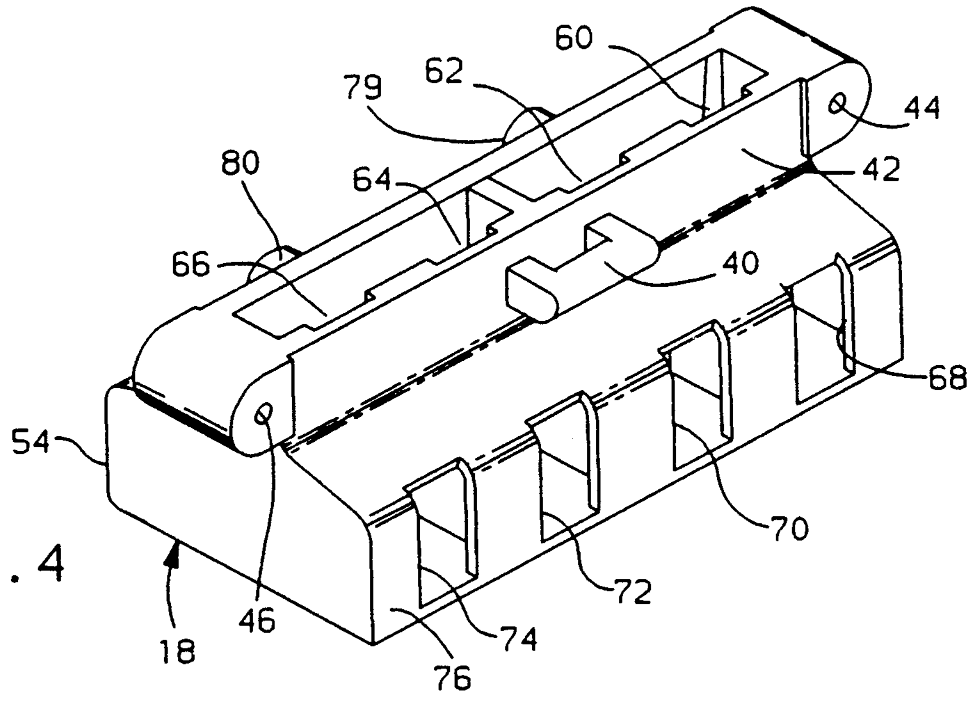

Referring to FIGS. 1 and 2, the reference numeral 10 generally designates a brush holder according to this invention, FIG. 1 after installation in a dynamoelectric machine and FIG. 2 prior to such installation. The brush holder 10 comprises a body element 12 semi-permanently attached to a housing element 14 of the machine and a cartridge element 18 detachably secured to the body element 12. A pair of pins 20, 22 are press fitted into the body element 12 and locate the body element 12 with respect to the housing element 14. The mounting bolt 24 an nut 26 secure a cable lug 16 to the body element 12. Once located, the pins 20, 22 are retained by bolt 28 and clamping block 29.

Figure 5:
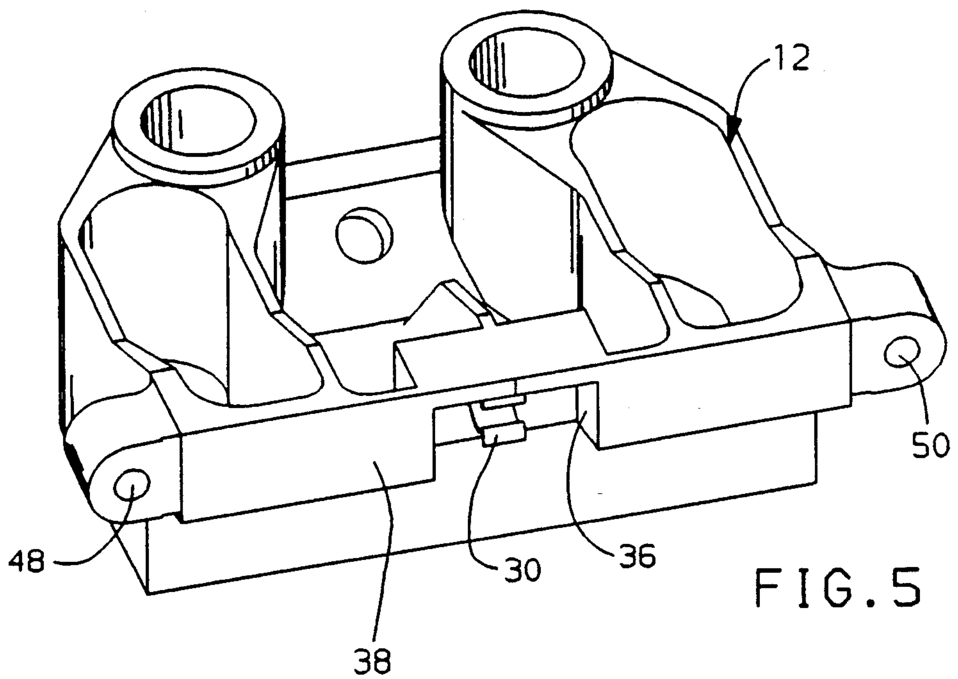

As best seen in FIGS. 1, 2 and 5, the cartridge element 18 is removably secured to the body element 12 by a spring clip 30 and a pair of bolts 32, 34. The clip 30 is riveted or otherwise secured to the body element 12 in a recess 36 of its outboard face 38, and is adapted to resiliently capture a post 40 formed on the inboard face 42 of cartridge element 18. The bolts 32, 34 are received in drilled openings 44, 46 of cartridge element 18, which align with threaded openings 48, 50 of body element 12. A handle 52 is provided on the outboard face 54 of cartridge element 18 to facilitate attachment and removal, as described below.

Figure 7:
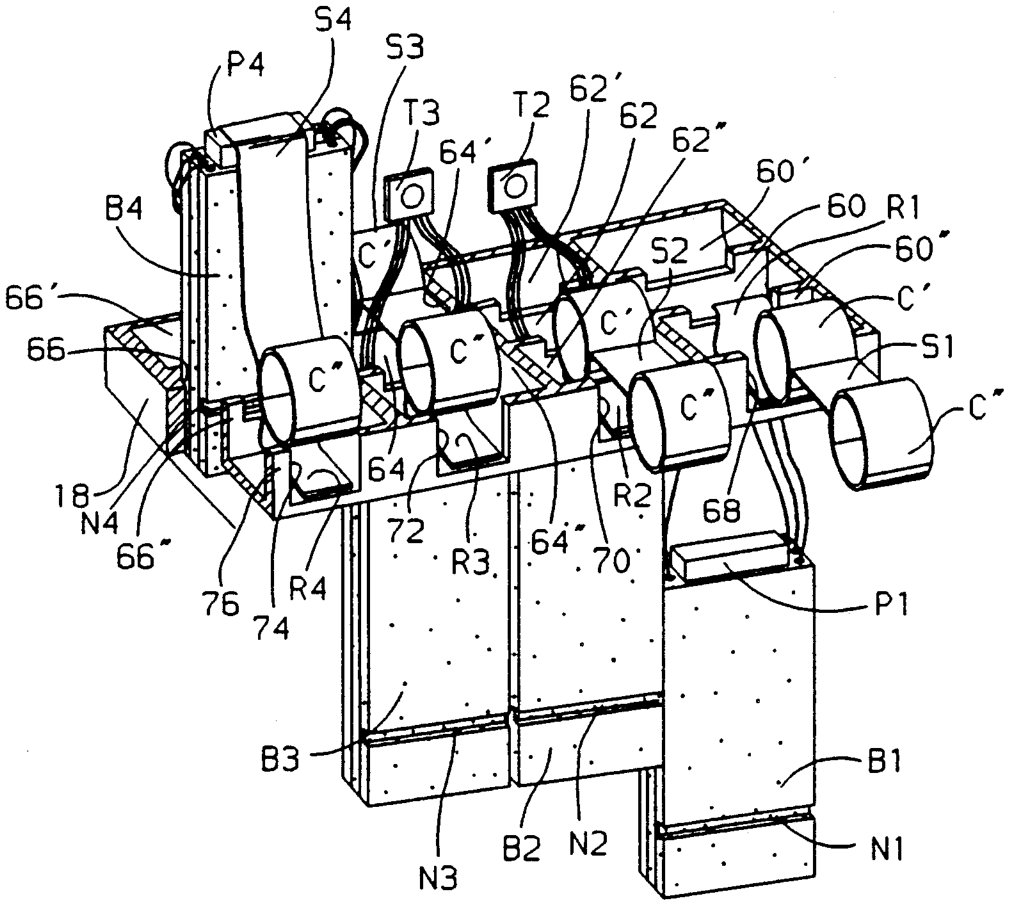

As best seen in the cut away view of FIG. 7, a number of intersecting walls subdivide the interior of cartridge element 18 into a series of four side-by-side rectangular brush compartments 60–66 and corresponding spring coil compartments 60′–66′ and 60″–66″ on either side of each brush compartment 60–66. Each brush compartment 60–66 is open at its top and bottom for receiving an elongated rectangular brush element B1, B2, B3, B4. The corresponding spring coil compartments 60′–66′ and 60″–66″ retain the coils C′, C″ of twin-coil spring elements S1, S2, S3, S4. Service openings 68–74 are provided on the inboard face 76 of cartridge element 18 to permit installation and removal of each spring element S1–S4.

Each brush B1–B4 has a set of conductors connected to a terminal T1–T4. As best seen in FIG. 2, the bolt 78 secures the terminals T1 and T2 to the boss 79, and the bolt 82 secures the terminals T3 and T4 to the boss 80. In the illustrated embodiment, the brushes B1–B4 are laminated in three layers; each has three conductors bonded to opposite sides of its upper face. A rubber or phenolic brush pad P1–P4 is glued to the upper face of each brush B1–B4 between the opposing conductors to distribute the force of the respective spring S1–S4.

As the brushes B1–B4 are inserted into the cartridge element 18, the spring coils C′, C″ unwind, as explained below, to urge the brushes B1–B4 downward as viewed in the Figures. Retractor clips R1–R4 situated in the bottom of each spring coil compartment 60″–66″ are adapted to retain the brushes B1–B4 in the inserted positions prior to the attachment of cartridge element 18 to body element 12. After such installation, slight upward movement of the brushes B1–B4 causes the retractor clips R1–R4 to release the brushes B1–B4, and the springs S1–S4 bring the brushes B1–B4 into resilient engagement with the commutator segments of the machine, indicated by the surface 90 in FIG. 1.

The brush installation and servicing procedure with the apparatus of this invention will now be described. At initial installation, the body element 12 is attached to the machine housing element 14 and cable lug 16, as described in reference to FIG. 1. This attachment is quite robust, as the body element 12 serves primarily to locate the cartridge element, and is not normally removed during servicing.

Figure 6:
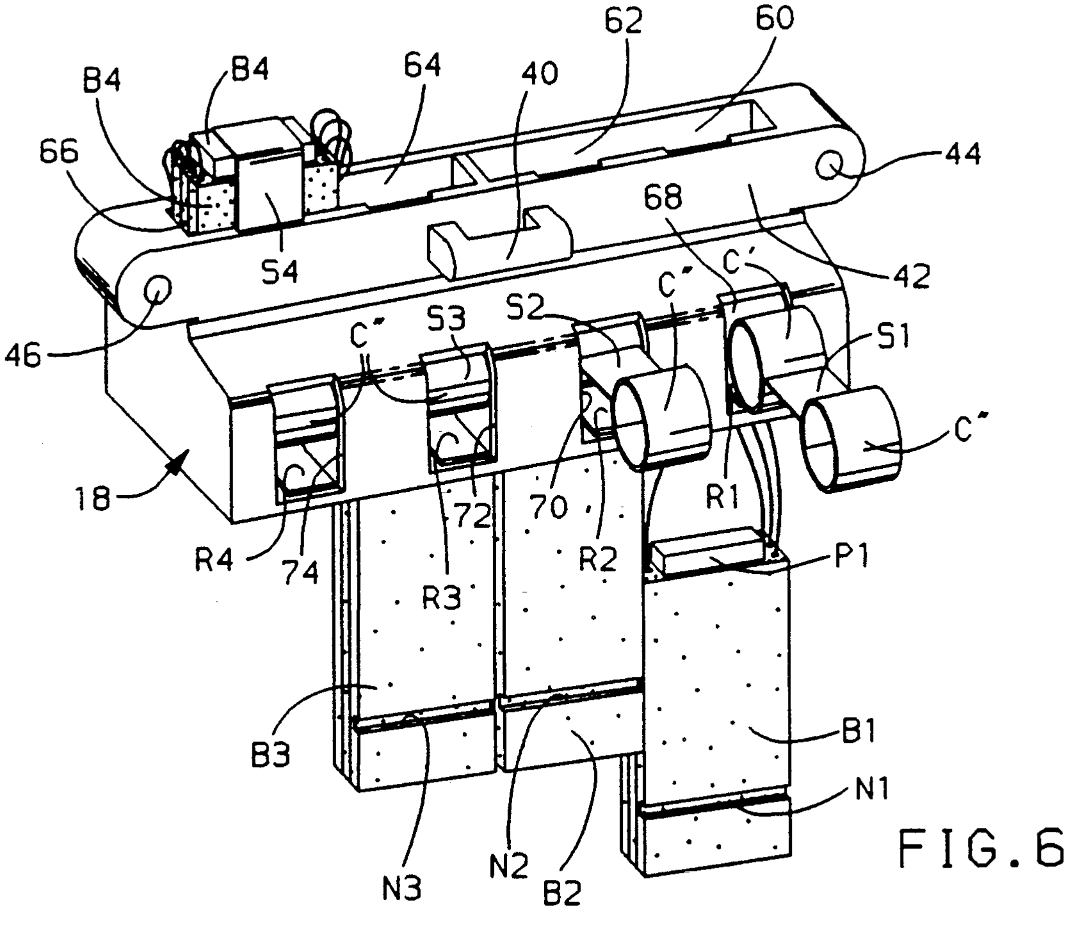
FIGS. 6 and 7 are perspective views illustrating the insertion of new brushes into the cartridge element.

The brush installation procedure is identical for each brush B1–B4, FIGS. 6 and 7 showing the brushes B1–B4 in various stages of insertion. Referring to brush B1, the brush is first positioned below the cartridge element 18, and the respective terminal T1 is drawn into the respective brush compartment 60. The twin-coil spring S1 is then inserted into the cartridge element 18, between the oppositely disposed brush conductors, via service opening 68. This state is illustrated by the spring S2 in FIGS. 6 and 7. Then, as illustrated by brush B3 in FIGS. 6 and 7, the brush is inserted further into the respective brush compartment 60–66 so that the respective pad P1–P4 engages the portion of the spring intermediate the coils C′, C″. As the brush insertion continues, the coils C′, C″ are lifted upward into engagement with the upper interior surfaces of the respective coil compartments 60′–66′, 60″–66″, as best seen in FIG. 1, and begin to unwind. When the brush is sufficiently inserted, a tool such as a screwdriver is used to extend the upper portion of the respective retractor clip R1–R4 into engagement with either a notch N1–N4 (FIG. 7) formed on the inboard face of the respective brush B1–B4 or the lower face of the brush B1–B4. This serves to retain the brush within the cartridge element 18 to facilitate insertion of the remaining brushes and attachment of the cartridge element 18 to the body element 12. Alternately, a retractor tool (not shown) may be inserted though the openings 92, 94 in bosses 79, 80. Finally, the terminals are attached to the bosses via bolts 78 and 82.

Once all four brushes B1–B4 have been inserted into the cartridge element 18 and retracted therein, as described above, the cartridge element 18 is attached to the body element 12, already in place in the machine. The initial attachment is via the coupling of spring clip 30 with post 40. This frees the technician's hands to attach the mounting bolts 32 and 34, firmly securing the cartridge element 18 to the body element 12. Then, each brush in turn is first elevated to return the respective retractor clip R1–R4 to its free position and then lowered to bring the respective brush B1–B4 into engagement with the machine commutator 90.

When servicing of the brushes is subsequently required, the technician removes the attachment bolts 32 and 34, and uncouples the cartridge element 18 from the body element 12 by pulling on the handle 52. The cartridge element 18 is then transported to a remote workbench. At this point, the technician removes springs S1–S4 and takes out the bolts 78 and 82 to free the terminals T1–T4. Once the brushes B1–B4 have been removed, the technician inspects the springs S1–S4, replacing them if necessary, and installs new brushes according to the procedure outlined above.

In view of the above, it will be seen that brush maintenance is greatly simplified with the brush holding apparatus of the present invention. Over and above the advantages inherent in a cartridge-type apparatus, the apparatus of the present invention accepts longer brush elements to extend the time between servicing, provides ease of servicing and improved protection for the spring assemblies.

While this invention has been described in reference to the illustrated embodiment, it is expected that various modifications will occur to those skilled in the art. In this regard, it should be understood that brush holders incorporating such modifications may fall within the scope of the present invention which is defined by the appended claims.

The embodiments of the invention in which an exclusive property or privilege is claimed are defined as follows:

1. Brush holding apparatus for a dynamoelectric machine, comprising:

- a body element rigidly secured to a housing of said machine and having a front face thereby disposed in proximity to said machine;
- spring means comprising a pair of coupled coil spring elements; and
- a cartridge element having at least one brush compartment defined in part by a rear face and oppositely disposed upper and lower faces, the rear face having a service opening through which said spring means is inserted, and the upper and lower faces having brush openings through which an elongate brush element is received, the coil spring elements of said spring means being adapted to unwind and tension said brush element as said brush element is inserted through said brush openings, the cartridge element being detachably secured to said body element so that the front face of said body element covers said service opening, enclosing said coil spring elements within said brush compartment.

2. The apparatus set forth in claim 1, including a retractor element R1 situated in said brush compartment for retaining said brush element following insertion.

3. The apparatus of claim 1, wherein the body and cartridge elements include complementary fastening elements which loosely secure the cartridge element to the body element, and at least one bolt to rigidly secure the cartridge element to the body element.

4. Brush holding apparatus for a dynamoelectric machine, comprising:

- a body element rigidly secured to a housing of said machine and having a front face thereby disposed in proximity to said machine;
- spring means comprising a pair of coupled coil spring elements; and
- a cartridge element internally subdivided to define at least one brush compartment and a pair of coil compartments oppositely disposed about said brush compartment, one of the coil compartments having a service opening through which said spring means is inserted, and the brush compartment being open at upper and lower faces thereof for receiving an elongate brush element, the coil spring elements of said spring means being adapted to unwind within said coil compartments and tension said brush element as said brush element is received within said brush compartment, the cartridge element being detachably secured to said body element so that the front face of said body element covers said service opening thereby enclosing said one of the coil compartments.

* * * * *